(12) United States Patent
Akkarakaran et al.

(10) Patent No.: US 7,986,748 B2
(45) Date of Patent: Jul. 26, 2011

(54) PEAK TO AVERAGE MITIGATION (75) Inventors: Sony John Akkarakaran, San Diego, CA (US); Aamod Khandekar, San Diego, CA (US); Alexei Gorokhov, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 906 days.

(21) Appl. No.: 11/298,083

(22) Filed: Dec. 8, 2005

(65) Prior Publication Data
US 2006/0286946 A1    Dec. 21, 2006

Related U.S. Application Data

(60) Provisional application No. 60/692,407, filed on Jun. 20, 2005.

(51) Int. Cl.
*H04L 25/49* (2006.01)

(52) U.S. Cl. .................................................. 375/296

(58) Field of Classification Search .................. 375/267, 375/296, 299, 347, 349; 398/193; 455/114.3, 455/101, 132–141; 700/53
See application file for complete search history.

(56) References Cited

U.S. PATENT DOCUMENTS

| | | | | |
|---|---|---|---|---|
| 5,148,448 A | * | 9/1992 | Karam et al. | 375/298 |
| 7,292,639 B1 | * | 11/2007 | Demirekler et al. | 375/260 |
| 2006/0008028 A1 | * | 1/2006 | Maltsev et al. | 375/297 |

* cited by examiner

*Primary Examiner* — Sam K Ahn
(74) *Attorney, Agent, or Firm* — Dmitry R. Milikovsky; William M. Hooks (57) ABSTRACT

A method and transmitter for generating a transmission signal are disclosed in various embodiments. In one step, a first magnitude relationship of a received first plurality of symbols is determined to see if it qualifies for modification. At least one of the first plurality of symbols are modified when the first magnitude relationship qualifies to produce a second plurality of symbols. A transmission signal is produced using the second plurality of symbols, where a second magnitude relationship of the second plurality of symbols is different than the first magnitude relationship.

42 Claims, 8 Drawing Sheets

PEAK TO AVERAGE MITIGATION

CLAIM OF PRIORITY PURSUANT TO USC §119(e)

This application claims priority from Provisional Application No. 60/692,407, filed Jun. 20, 2005, entitled "Peak To Average Mitigation By Quantization Dithering" and is assigned to the assignee of the present application, which is incorporated by reference in its entirety.

BACKGROUND

The present disclosure relates generally to communication, and, amongst other things, to transmitters used in communication systems.

Communication systems transport information between two points, for example, wirelessly. A base station communicates wirelessly with one or more access terminals to transport data, voice or other information. The term base station can be used interchangeably with access point or access terminal, and the term access terminal can be used interchangeably with wireless communication device, user equipment, handset, or mobile station or unit.

In a wireless communication system, an RF modulated signal from a transmitter may reach a receiver via a number of propagation paths. The characteristics of the propagation paths typically vary over time due to a number of factors such as fading and multipath. To provide diversity against deleterious path effects and improve performance, multiple transmit and receive antennas may be used. A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel.

An orthogonal frequency division multiple access (OFDMA) system is a multi-access system that utilizes OFDM. OFDM is a multi-carrier modulation technique that partitions the overall system bandwidth into multiple orthogonal frequency subcarriers. An OFDMA system may use time and/or frequency division multiplexing to achieve orthogonality among multiple data transmissions for multiple access terminals. For example, different terminals may be allocated different subbands, and the data transmission for each terminal may be sent on the subband(s) allocated to this terminal. By using disjoint or non-overlapping subbands for different terminals, interference among the multiple terminals may be avoided or reduced, and improved performance may be achieved. The number of non-overlapping subbands available for data transmission is limited (to K) by the OFDM structure used for the OFDMA system. The limited number of subbands places an upper limit on the number of terminals that may transmit and/or receive simultaneously without interfering one another.

Often, transmission signals exhibit a high peak-to-average ratio (PAR). This can cause distortion when passed through non-linear power-amplifiers that are commonly found in transmitters. Conventional techniques reduce the PAR using clipping or back-off of the time-domain transmission waveform to operate in the linear region, which wastes power because power-amplifiers are more efficient when operated in the non-linear region. Other techniques consume bandwidth by injecting an additional counter-waveform that is summed with the transmission waveform to reduce the peaks, but this consumes bandwidth. One such technique uses tone reservation where one tone is reserved to use as a counter signal to reduce the PAR.

SUMMARY

In some embodiments, the present disclosure provides a method and transmitter for generating a transmission signal with a magnitude relationship for the transmission signal. In one step, a first magnitude relationship of a received first plurality of symbols is determined to see if it qualifies for modification. At least one of the first plurality of symbols are modified when the first magnitude relationship qualifies to produce a second plurality of symbols. The transmission signal is produced using the second plurality of symbols, where a second magnitude relationship of the second plurality of symbols is different than the first magnitude relationship. In some embodiments, the modification to produce a second plurality of symbols is performed in the time domain.

In other embodiments, the present disclosure provides a transmitter for sending a signal, where the transmitter includes an analysis unit, a symbol modification unit and a transform unit. The analysis unit analyzes a magnitude of a first transmission signal, wherein the first transmission signal is representative of a first plurality of symbols. The symbol modification unit can change one or more symbols based, at least in part, on the magnitude. The symbol modification unit modifies the first plurality of symbols to produce a second plurality of symbols, where the first plurality of symbols and the second plurality of symbols represent a same data in the signal. The transform unit is coupled to the symbol modification unit and the analysis unit, where the transform unit converts the second plurality of symbols to a second transmission signal.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide various implementations of interchangeable functions and features. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

OFDM waveforms exhibit a high peak-to-average ratio, which can cause the waveform to distort when passed through nonlinear power-amplifiers. In some embodiments, a peak-to-average ratio (PAR) of the transmitted waveform is reduced, thus reducing the ill-effects of this distortion, for example, loss of data, decreased data rates, decreased bandwidths or inefficient power consumption. Based upon an analysis of the PAR of the transmitter waveform, the symbols are modified to reduce the PAR. In some embodiments, the modification involves changing or truncating the least significant bit (LSB) of some or all modulation symbols fed into an inverse Fast Fourier transform (IFFT). Other embodiments could modify or truncate two or more LSBs for each modulation symbol.

Multi-channel communication systems include multiple-input multiple-output (MIMO) communication systems, orthogonal frequency division multiplexing (OFDM) communication systems, MIMO systems that employ OFDM (i.e., MIMO-OFDM systems), orthogonal frequency division multiple access (OFDMA) communication systems, and other types of transmissions. For clarity, various aspects and embodiments are described specifically for a MIMO system, but could be utilized in a SIMO, SISO or other topology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels. The number of spatial subchannels, $N_S$, is determined by the number of eigenmodes for the MIMO channel, which in turn is dependent on a channel response matrix, H, that describes the response between the $N_T$ transmit and $N_R$ receive antennas. The elements of the channel response matrix, H, are composed of independent Gaussian random variables $\{h_{i,j}\}$, for i=1, 2, ... $N_R$ and j=1, 2, ... $N_T$, where $h_{i,j}$ is the coupling (i.e., the complex gain) between the j-th transmit antenna and the i-th receive antenna. For simplicity, the channel response matrix, H, is assumed to be full-rank (i.e., $N_S=N_T \leq N_R$), and one independent data stream may be transmitted from each of the $N_T$ transmit antennas.

Figure 1:
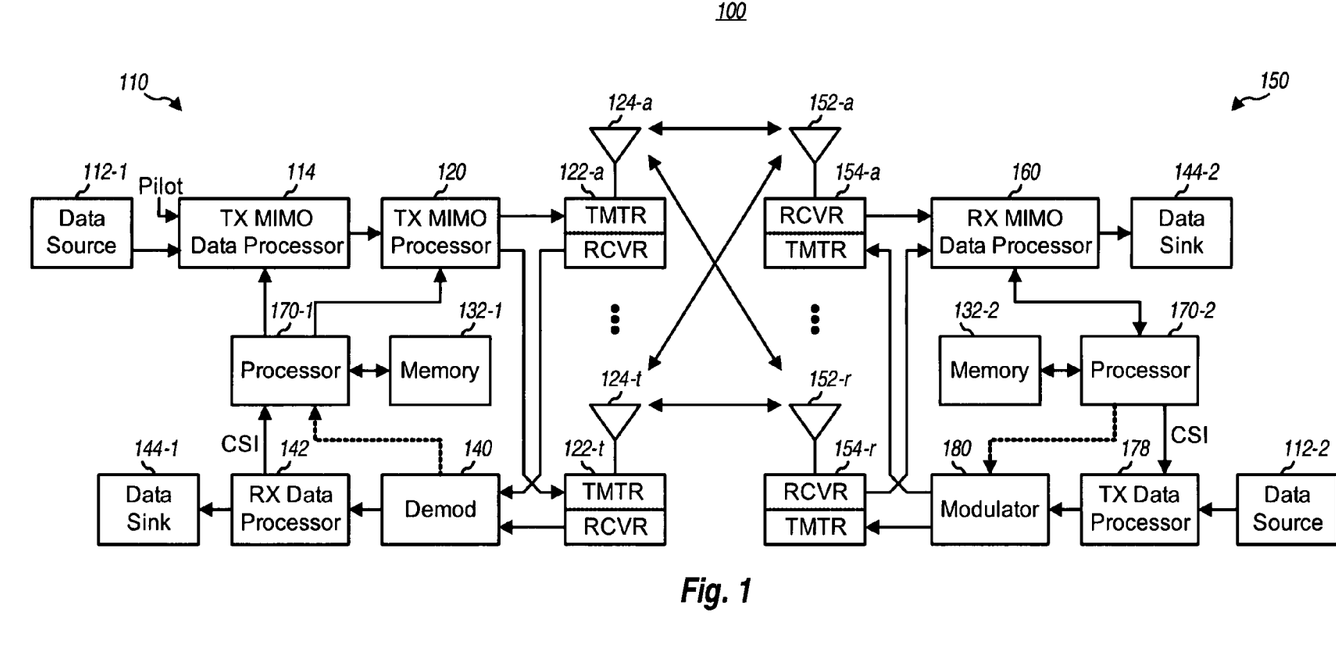
FIG. 1 depicts a block diagram of embodiments of a base station and an access terminal communicating.

With reference to FIG. 1, a block diagram of embodiments of a base station 110 and an access terminal 150 having a MIMO configuration is shown. The base station 110 communicates with multiple antennas 124. Similarly, the access terminal 150 communicates with multiple antennas 152. At the base station 110, traffic data for a number of data streams is provided from a data source 112-1 to a transmit (TX) MIMO data processor 114. In some embodiments, each data stream is transmitted over a respective base station antenna 124.

The TX MIMO data processor 114 formats, codes and interleaves the traffic data for each data stream based upon a particular coding scheme selected for that data stream to provide coded data. In some embodiments, the TX MIMO data processor 114 applies beamforming weights to the symbols of the data streams based upon the access terminal 150 to which the symbols are being transmitted and the antenna 124 from which the symbol is being transmitted.

The coded data for each data stream may be multiplexed with pilot data using OFDM techniques. The pilot data is typically a known data pattern that is processed in a known manner and may be used at the access terminal 150 to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream or symbol(s) to provide modulation symbols. The data rate, coding and modulation for each data stream may be determined by instructions performed on a processor 170-1. In some embodiments, the number of parallel spatial streams may be varied according to the rank information that is transmitted from the access terminal 150.

The modulation symbols for all data streams are then provided to a TX MIMO processor 120 that may further process the modulation symbols (e.g., for OFDM). The TX MIMO processor 120 then provides $N_T$ symbol streams to $N_T$ transmitters/receivers (TMTR/RCVR) 122. Each TMTR 122 receives and processes a respective symbol stream to provide one or more analog signals, and further conditions (e.g., amplifies, filters, upconverts, etc.) the analog signals to provide a modulated signal suitable for transmission of the MIMO channel, H. $N_T$ modulated signals from the $N_T$ TMTRs 122 are then transmitted from $N_T$ antennas 124, respectively.

At the access terminal 150, the transmitted modulated signals are received by $N_R$ antennas 152 and the received signal from each antenna 152 is provided to a respective receiver/transmitter (RCVR/TMTR) 154. Each RCVR 154 conditions (e.g., filters, amplifies, downconverts, etc.) a respective received signal, digitizes the conditioned signal to provide samples, and further processes the samples to provide a corresponding received symbol stream.

An RX MIMO processor 160 then receives and processes the $N_R$ received symbol streams from $N_R$ receivers 154 based upon a particular receiver processing technique to provide the rank number of detected symbol streams. Each detected symbol stream includes symbols that are estimates of the modulation symbols transmitted for the corresponding data stream. The RX MIMO processor 160 then demodulates, deinterleaves and decodes each detected symbol stream to recover the traffic data for the data stream. Decoding can be done in several stages with varying redundant decoding algorithms. The processing of the RX MIMO processor 160 is generally complementary to that performed by the TX MIMO data processor 114 and the TX MIMO processor 120 at the base station 110.

Other functions are performed by the base station 110 and access terminal 150. A data source 112-2 of the access terminal 150 passes through a TX data processor 178, a modulator 180, and a TMTR 154 before passing over the wireless media to the base station 110. Upon passing the wireless media over the channel matrix, H, the signal passes antennas 124, RCVRs 122, a demodulator 140, and a receiver (RX) data processor 142 to a data sink 144-1. A first path from the access terminal data source 112-2 to the base station data sink 144-1 can use PAR mitigation as can a second path from the base station data source 112-1 to the access terminal data sink 144-2.

RX MIMO data processor 160 may derive an estimate of the channel response between the $N_T$ transmit and $N_R$ receive antennas, e.g., based on the pilot multiplexed with the traffic data. The channel response estimate may be used to perform space or space/time processing at the receiver. RX MIMO data processor 160 may further estimate the signal-to-noise-and-interference ratios (SNRs) of the detected symbol streams, and possibly other channel characteristics, and provides these quantities to a processor 170-2.

RX MIMO Data processor 160 or processor 170-1 may further derive an estimate of the "operating" SNR, or other channel information, e.g. signal-to-noise ratios, for the system. The channel information is indicative of the conditions of the communication link. The processor 170-2 then provides the channel information as channel state information (CSI), which may comprise various types of information regarding the communication link and/or the received data stream. For example, the CSI may comprise only the operating SNR. The CSI is then processed by a TX data processor 178, modulated by a modulator 180, conditioned by transmitters 154*a* through 154*r*, and transmitted back to base station 110. The modulator 108 can control PAR to operate a nonlinear power amplifier in the transmitter, according to the various embodiments described herein.

At the base station 110, the modulated signals from the access terminal 150 are received by antennas 124, conditioned by receivers 122, demodulated by a demodulator 140, and processed by a RX data processor 142 to recover the CSI reported by the receiver system. The reported CSI is then provided to processor 170-1 and used to (1) determine the data rates and coding and modulation schemes to be used for the data streams and (2) generate various controls for TX MIMO data processor 114 and TX MIMO processor 120. In other embodiments, the CSI is utilized by the receiver 1156 to determine operating parameters for signals to be transmitted to the receiver, e.g. modulation formats, beam steering weights, etc. This information may then be transmitted to the transmitter either directly or via a set of quantized bits, e.g. from a codebook known at the transmitter.

The processors 170 respectively direct the operation at the base station 110 and the access terminal 150 that they are coupled with including the appropriate transmit and receive data processors 114, 160. Memories 132 respectively provide storage for program codes and data used by processors 170.

Figure 2:
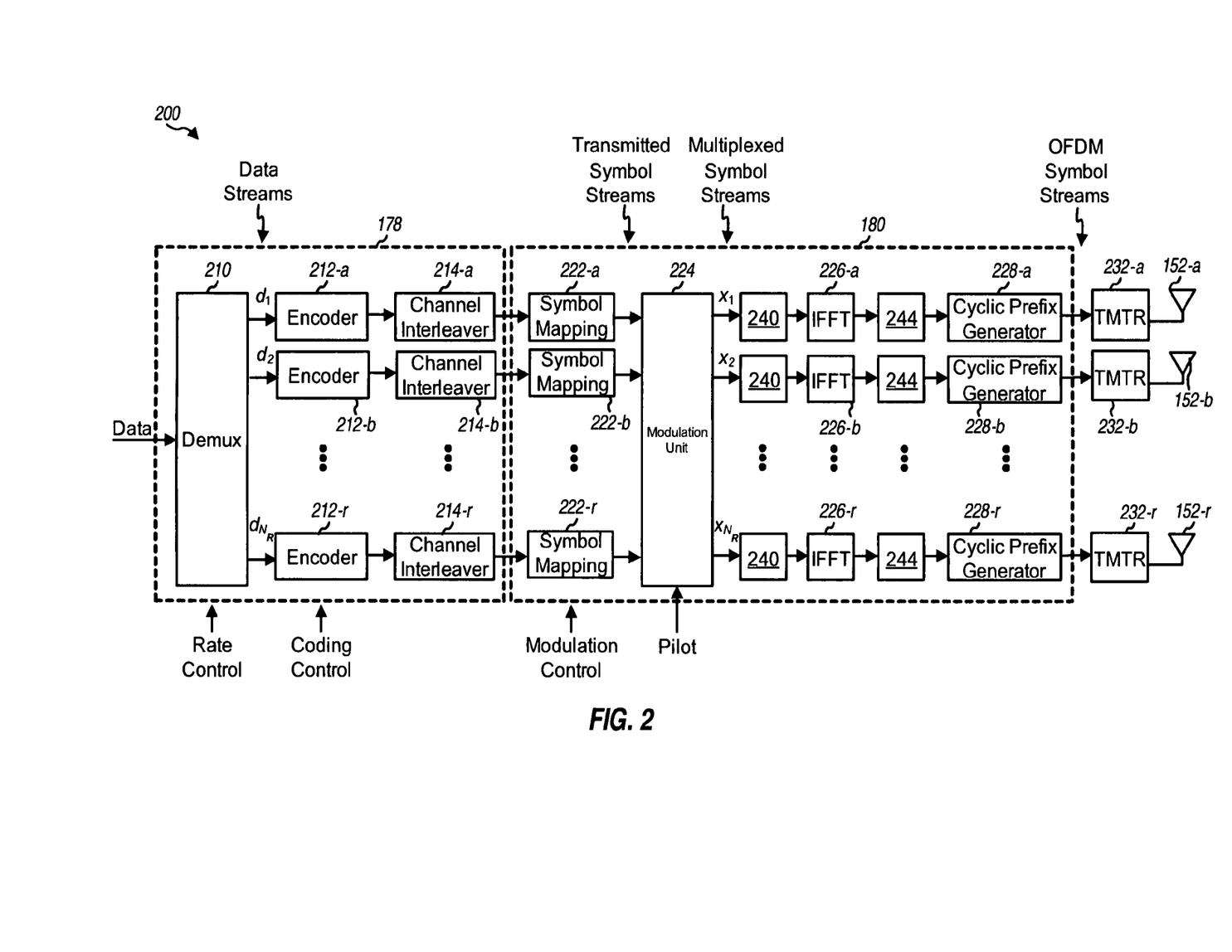
FIG. 2 depicts a block diagram of embodiments of a portion of an access terminal.

FIG. 2 is a block diagram of a portion of an access terminal 200, which may include various embodiments of the transmitter portion of a transmitter system, e.g. such as transmitter system 110 in FIG. 1. In some embodiments, a separate data rate and coding and modulation scheme may be used for each of the $N_R$ data streams to be transmitted on the $N_R$ transmit antennas (i.e., separate coding and modulation on a per-antenna basis). The specific data rate and coding and modulation schemes to be used for each antenna 124, 152 may be determined based on controls provided by the processor 170.

In one embodiment, the access terminal portion 200 includes a transmit data processor 178 and modulator 180 that receive, code and modulate each data stream in accordance with a separate coding and modulation scheme to provide modulation symbols. The modulated pilot and data symbols are passed to transmitters 232 that use antennas 152 to wirelessly pass the symbols to the base station 110.

In some embodiments, transmit data processor 178 includes demultiplexer 210, $N_R$ encoders 212, and $N_R$ channel interleavers 214 (i.e., one set of demultiplexers, encoders, and channel interleavers for each transmit antenna 152). Demultiplexer 210 demultiplexes data (i.e., the information bits) into $N_R$ data streams for the $N_R$ transmit antennas 152 to be used for data transmission. The $N_R$ data streams may be associated with a same or different data rates, as determined by rate control functionality, which in some embodiments may be provided by the processor 170. Each data stream is provided to a respective encoder 212.

Each encoder 212 receives and codes a respective data stream based on the specific coding scheme selected for that data stream to provide coded bits. In some embodiments, the coding may be used to increase the reliability of data transmission. The coding scheme may include in some embodiments any combination of cyclic redundancy check (CRC) coding, convolutional coding, Turbo coding, block coding, or the like. The coded bits from each encoder 212 are then provided to a respective channel interleaver 214, which interleaves the coded bits based on a particular interleaving scheme. In some embodiments, the interleaving provides time diversity for the coded bits, permits the data to be transmitted based on an average SNR for the transmission channels used for the data stream, combats fading, and further removes correlation between coded bits used to form each modulation symbol.

The coded and interleaved bits from each channel interleaver 214 are provided to a respective symbol mapping block 222 of the modulator 180 that maps these bits to form modulation symbols. The particular modulation scheme to be implemented for each symbol, group of symbols, or data stream by symbol mapping block 222 is determined by the modulation control provided by processor 170. Each symbol mapping block 222 groups sets of $q_j$ coded and interleaved bits to form non-binary symbols, and further maps each non-binary symbol to a specific point in a signal constellation corresponding to the selected modulation scheme (e.g., QPSK, M-PSK, M-QAM, or some other modulation scheme). Each mapped signal point corresponds to an $M_j$-ary modulation symbol, where $M_j$ corresponds to the specific modulation scheme selected for the j-th transmit antenna and $M_j=2^{q_j}$. Symbol mapping blocks 222 then provide $N_R$ streams of modulation symbols.

The modulator 180 also includes modulation units 224, modulation dither units 240, inverse Fast Fourier transform (IFFT) blocks 226, PAR analysis units 244, and cyclic prefix generators 228. The modulation unit 224 modulates the samples to form the modulation symbols for the $N_R$ streams on the proper subbands and transmit antennas 152. In addition, the modulation unit 224 provides each of the $N_R$ symbol streams at a proscribed power level. In some embodiments, the modulation unit 224 may modulate symbols according to a hopping sequence controlled by a processor 170. In such embodiments, the frequencies with which the $N_R$ symbol streams are modulated may vary for each group or block of symbols, frame, or portion of a frame of a transmission cycle.

The symbol dither unit 240 can adjust bits of the modulation symbols in a symbol stream. When a PAR analysis unit 244 determines that the transmission signal has an undesirable magnitude for a given set of modulation symbols. One such magnitude test is the PAR of the transmission signal. When the PAR or some other magnitude relationship reaches a threshold, the symbol dither unit 240 is signaled to modify the modulation symbols in an attempt to lower the magnitude relationship below the threshold. One or more iterations of this process may occur before using the transmission signal in the transmitter 232. The symbol dither unit acts as a waveform added to the transmission signal that is provided by dithering the least significant bit of the modulation symbols. The additional distortion introduced by the symbol dither unit 240 is generally buried within the quantization noise such that the traffic data over the transmission channel is received and decoded properly.

Each IFFT block 226 receives a respective modulation symbol stream from the modulation unit 224. Each IFFT block 226 groups sets of $N_F$ modulation symbols to form corresponding modulation symbol vectors, and converts each modulation symbol vector into its time-domain representation (which is referred to as an OFDM symbol) using the inverse fast Fourier transform. IFFT blocks 226 may be designed to perform the inverse transform on any number of frequency subchannels (e.g., 8, 16, 32, 128, 256, 512, . . . , $N_F$).

Each time-domain representation of the modulation symbol vector generated by IFFT blocks 226 is provided to an associated cyclic prefix generator 228 after any iterations in changing the modulation symbol in the vector. The cyclic prefix generators 228 pre-pending a prefix of a fixed number of samples, which are generally a number of samples from the end of the OFDM symbol, to the $N_S$ samples that constitute an OFDM symbol to form a corresponding transmission symbol. The prefix is designed to improve performance against deleterious path effects such as channel dispersion caused by frequency selective fading. Cyclic prefix generators 228 then provide a stream of transmission symbols to an associated transmitter 232 which causes the symbols to be transmitted by antennas 152.

Figure 3A:
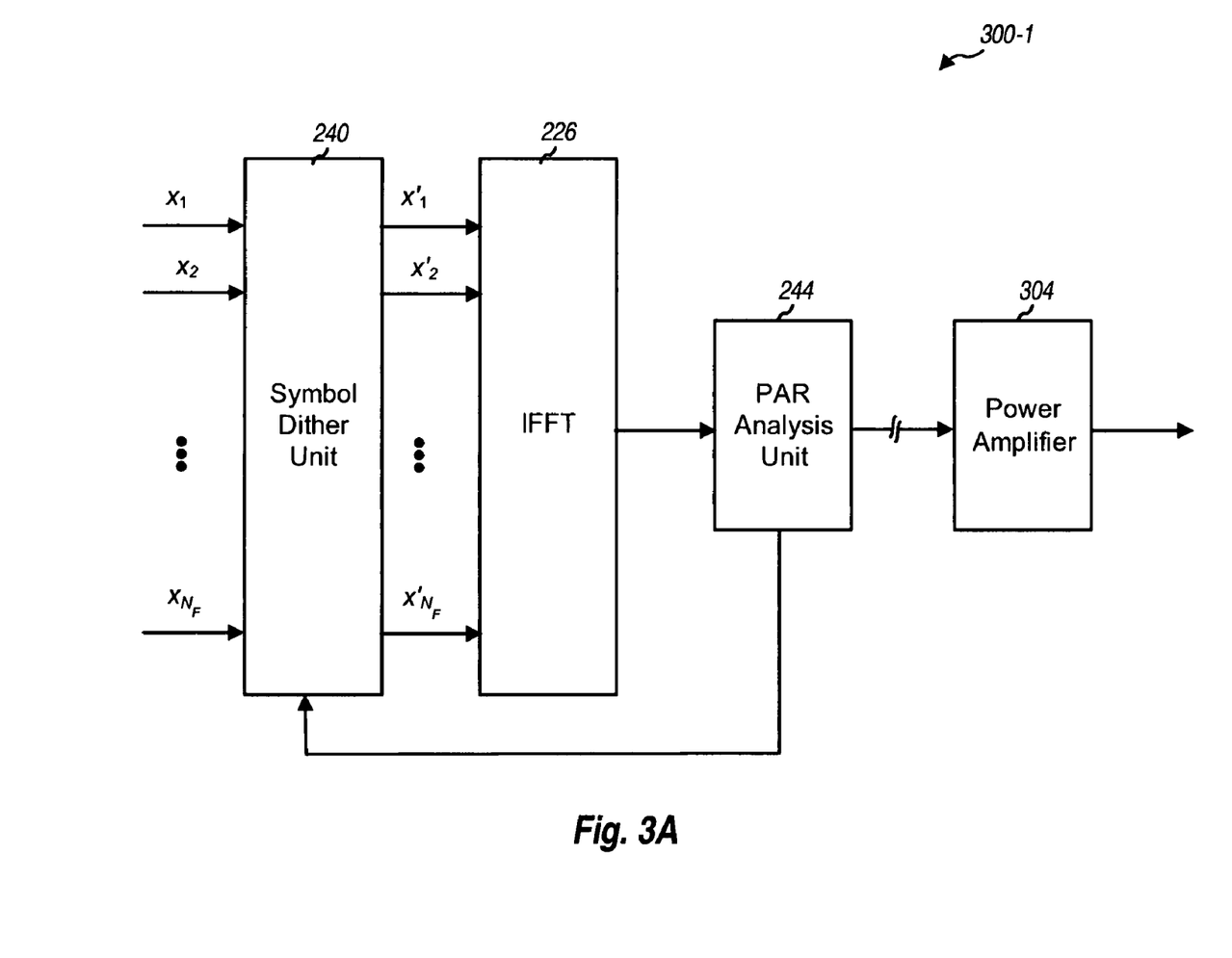
FIGS. 3A, 3B and 3C depict block diagrams that illustrate embodiments of a portion of a transmitter.

With reference to FIG. 3A, a block diagram for embodiments of portions 300-1 of a modulator 180 and a transmitter 232 is shown. $N_F$ modulation symbols, x, in a stream of modulation symbol vectors are passed from the modulation unit to a symbol dither unit 240. Ultimately, each modulation symbol in the vector is processed for one of the $N_F$ subcarriers. The symbol dither unit 240 changes some or all of the $N_F$ modulation symbol vector when the PAR analysis unit determines that the PAR is out of range for a particular modulation symbol vector.

In these embodiments, the IFFT 226 is fast enough to allow a number of iterations with the symbol dither unit 240 to find a combination of modulation symbol modifications that reduces the PAR. The symbol dither unit 240 randomly modifies the modulation symbols in these embodiments, but other embodiments could use a genetic or other algorithm. For example, when the PAR is beyond a threshold, the symbol dither unit 240 could change the LSB for each modulation symbol in the vector to zero. If the Fourier transform of the vector reduced the transmission signal magnitude, that modulation symbol vector would be preferred over the original unmodified modulation symbol vector.

So long as there is still time for more iterations, this process could proceed cyclically until the best modulation symbol vector were found by modifying one or more of the LSBs for one or more of the modulation symbols in the vector. Some embodiments could modify one, two, one-quarter, one-third, one-half or more of the modulation symbols in the vector. Which modulation symbols are modified could be random as could the changes done to the chosen modulation symbols in various embodiments. The chosen modulation symbol vector is ultimately converted to a transmission signal and passed to a nonlinear power amplifier 304 in the transmitter 232.

For each path from the modulation unit 224 to the antennas 152, this process happens in parallel in these embodiments. Other embodiments, use all the paths in performing iterations to find a modulation symbol vector that reduces PAR when a threshold is crossed. Although these embodiments trigger on PAR values, any magnitude relationship could be used on the transmission signal to trigger the symbol dither unit 240, e.g. maximum or minimum magnitudes, average or mean magnitudes above or below predetermined thresholds or the like.

It should be noted that while FIGS. 1 and 2 refer to performing dithering or PAR reduction at access terminal 150, the same or similar functions, procedures, and/or structures may be applied to the access point.

Figure 3B:
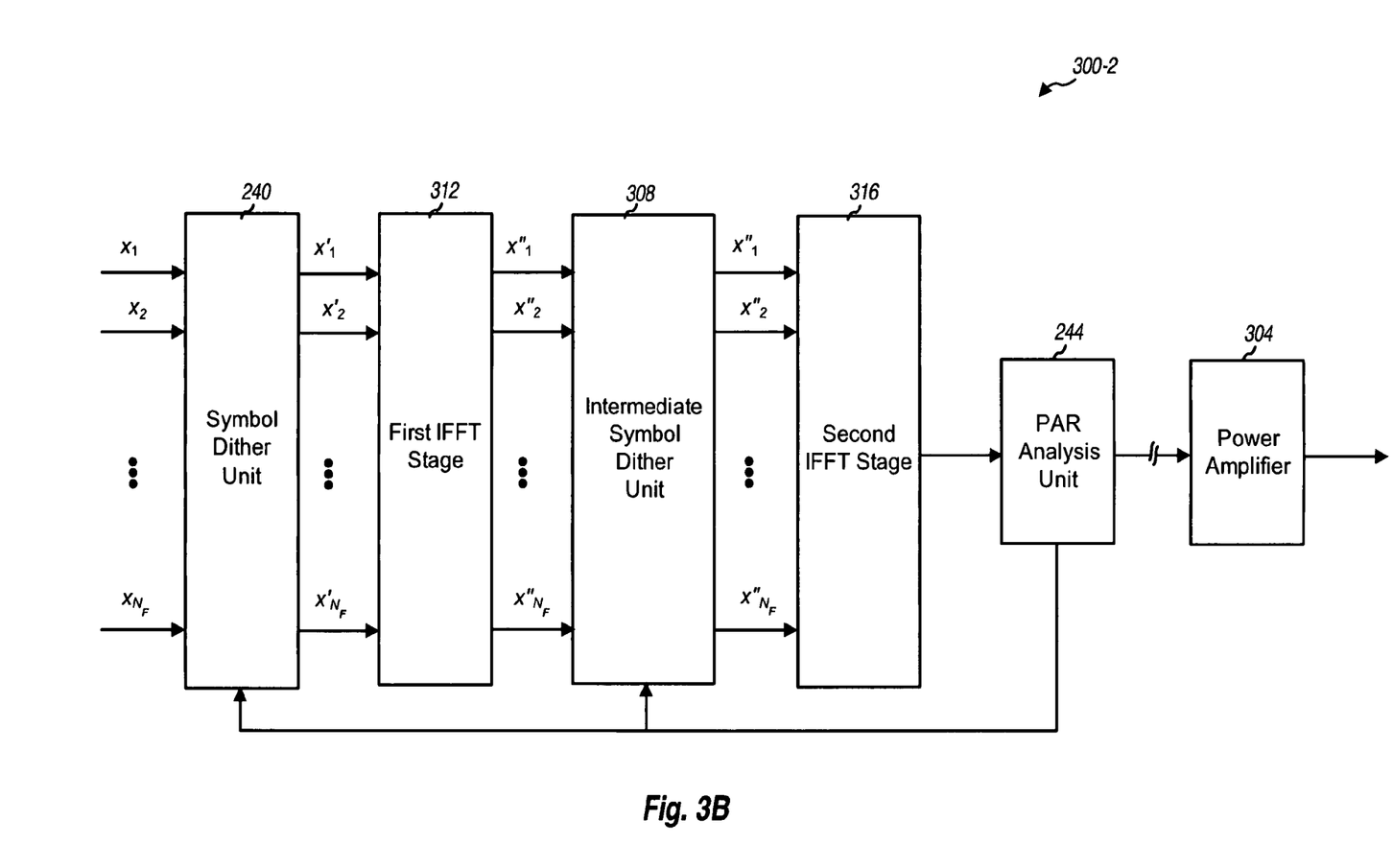

Referring next to FIG. 3B, a block diagram for another embodiment of portions 300-2 of a modulator 180 and a transmitter 232 is shown. In this embodiment, the IFFT is broken into two or more stages. In this embodiment, there are two stages for the IFFT where the first IFFT stage 312 ends at a node in the butterfly structure of the IFFT, but other embodiments could have any number of stages that are punctuated with any number of intermediate symbol dither units. By bringing the dithering function closer to the PAR analysis unit 244, some embodiments can achieve iterations more quickly.

The sole intermediate symbol dither unit 308 of this embodiment along with the symbol dither unit 240 are controlled by the PAR analysis unit 244 to achieve the desired PAR. The PAR analysis unit 244 makes a determination if PAR is likely to be beyond a threshold. Where the threshold is crossed, iterations can take place by modified modulation symbol vectors and/or modification of intermediate values between the first and second IFFT stages 312, 316. Once the output from the second IFFT stage 316 falls below the PAR threshold or time has run out to keep iterating, the PAR analysis unit 244 passes the signal. In this way, a transmission signal is passed to the power amplifier that has better PAR characteristics. The dithering in the regular and intermediate symbol dither units 240, 308 do not distort the transmission signal beyond recognition by the base station 110 as the dithering is generally lost in the quantitization noise.

Figure 3C:
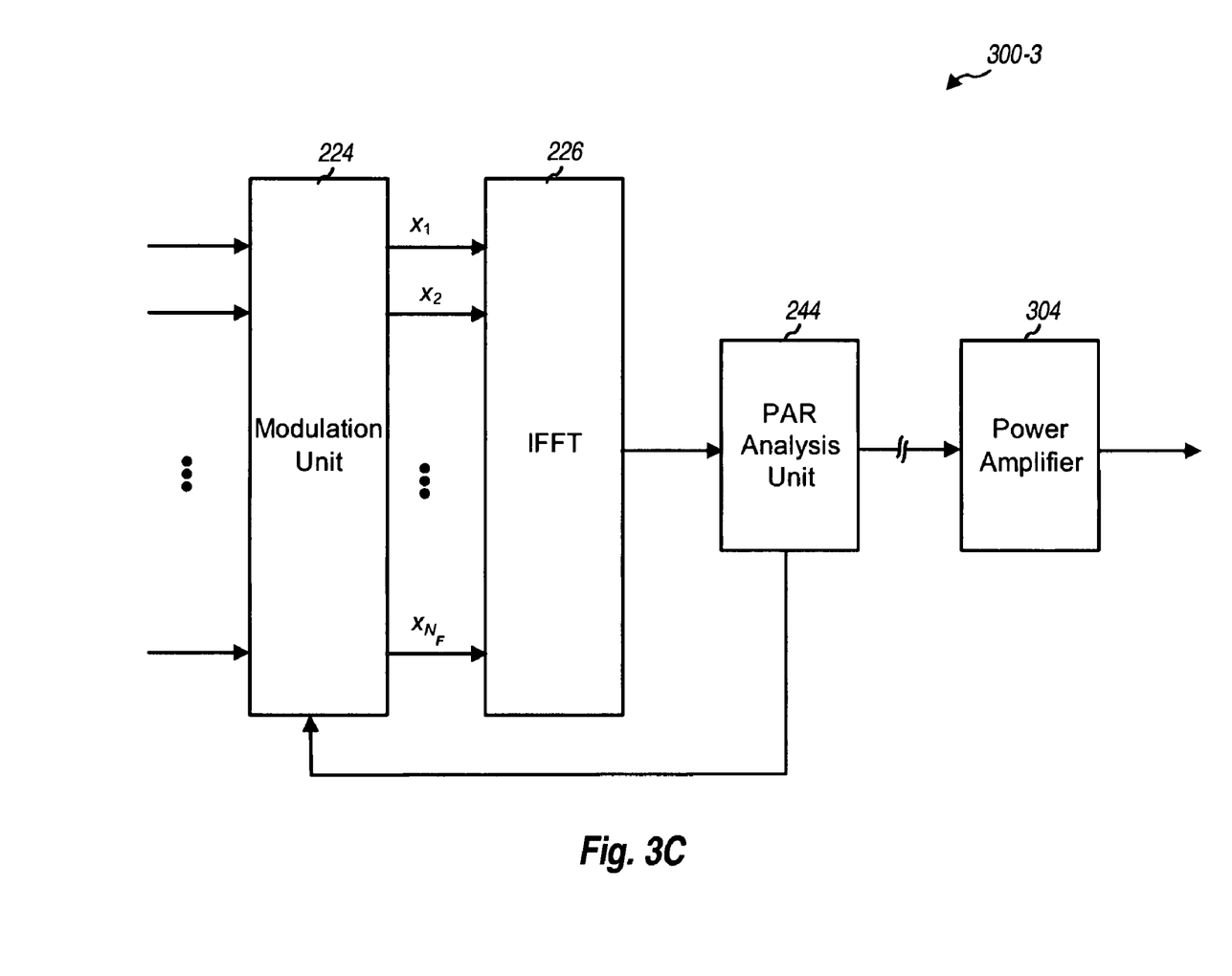

With reference to FIG. 3C, a block diagram for further embodiments of portions 300-3 of a modulator 180 and a transmitter 232 is shown. In these embodiments, that PAR analysis unit 244 signals the modulation unit 224 when the current modulation symbol vector results in a transmission signal with PAR out of range. The modulation unit 224 can modify one, two, three or more of the modulation symbols in the vector in a way that doesn't affect the receipt of the data by the base station 110. For example, the modulation unit 224 could change the modulation algorithm in response to the excessive PAR.

Figure 4A:
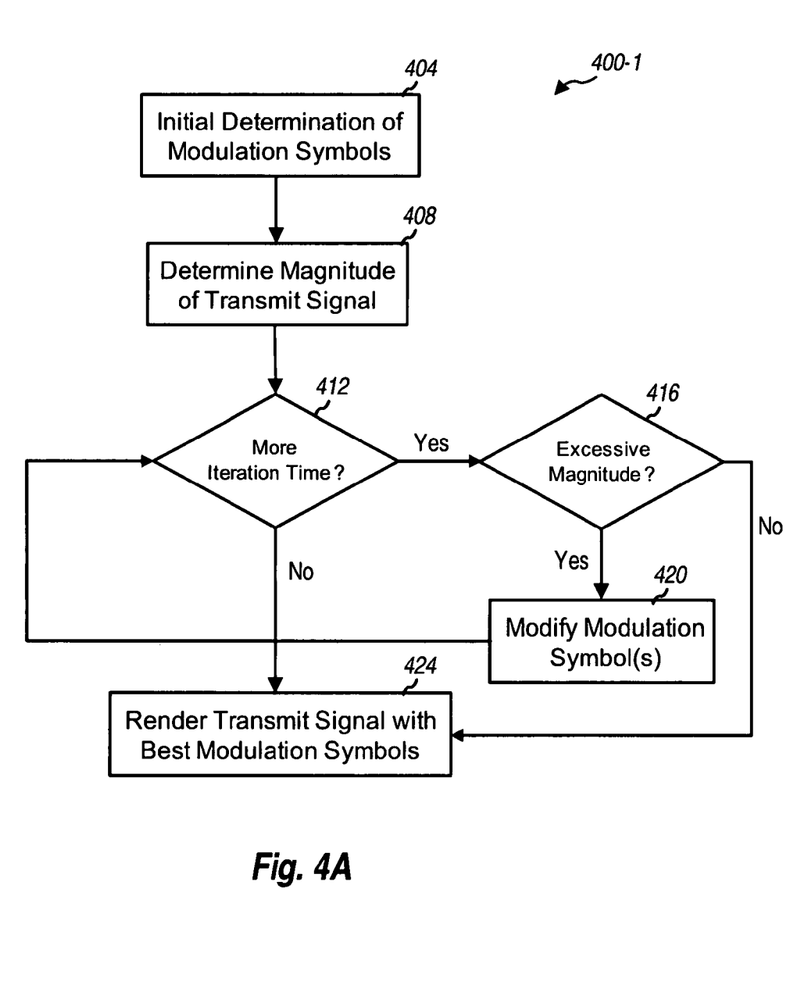
FIGS. 4A and 4B illustrate flow diagrams of embodiments of processes for reducing a magnitude, or magnitudes, of a transmit signal.

Referring next to FIG. 4A, a flow diagram of embodiments of a process 400-1 for reducing a magnitude of a transmit signal is shown. The depicted portion of the process begins at block 404 where there is an initial determination of the modulation symbol vector. The magnitude of the transmission signal that would result from the modulation symbol vector is determined, block 408. At block 412, a determination is made to decide if there is time for additional iterations should the magnitude function be outside of the acceptable range. Where there is no time for another iteration, processing goes from block 412 to block 424 where the transmission signal is rendered and sent to the antenna 232.

Where there is additional time as determined, e.g. block 412, processing continues to block 416 where a determination is made to see if the transmission signal has an excessive magnitude. Where the magnitude is within range, processing continues, block 424, for sending the transmission signal. Should it be determined, block 416, that the magnitude is excessive, processing continues, block 420, where the symbol dither unit or other unit modifies one or more modulation symbols in the vector. Processing loops back to perform another iteration so long as time permits.

Figure 4B:
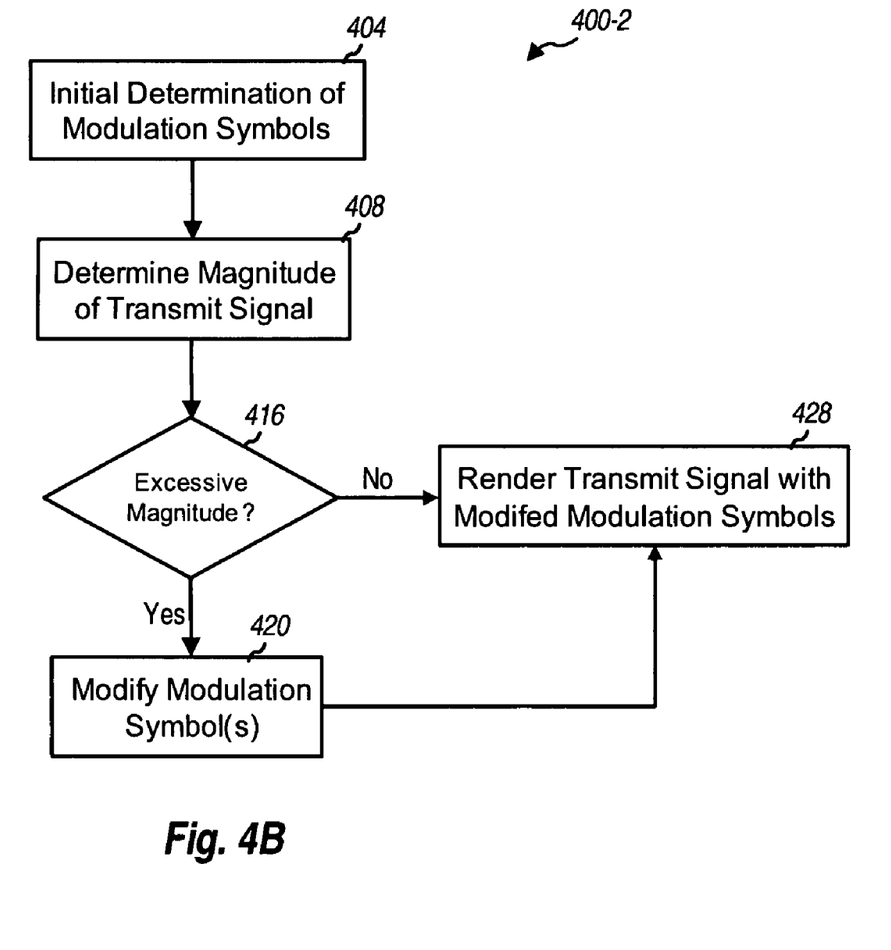

With reference to FIG. 4B, a flow diagram of other embodiments of a process 400-2 for reducing a magnitude of a transmit signal is shown. In these embodiments, a look-up table or algorithm is used to determine how to modify the modulation symbol vector when PAR is out of range. After blocks 404 and 408, the magnitude is checked in block 416. Where the magnitude is in range the transmit signal is determined in block 428. If the magnitude is out of range in block 416, processing goes to block 420 where the modulation symbol vector is checked against a look-up table to find the dither modification to the modulation symbol vector to reduce the magnitude.

Figure 5:
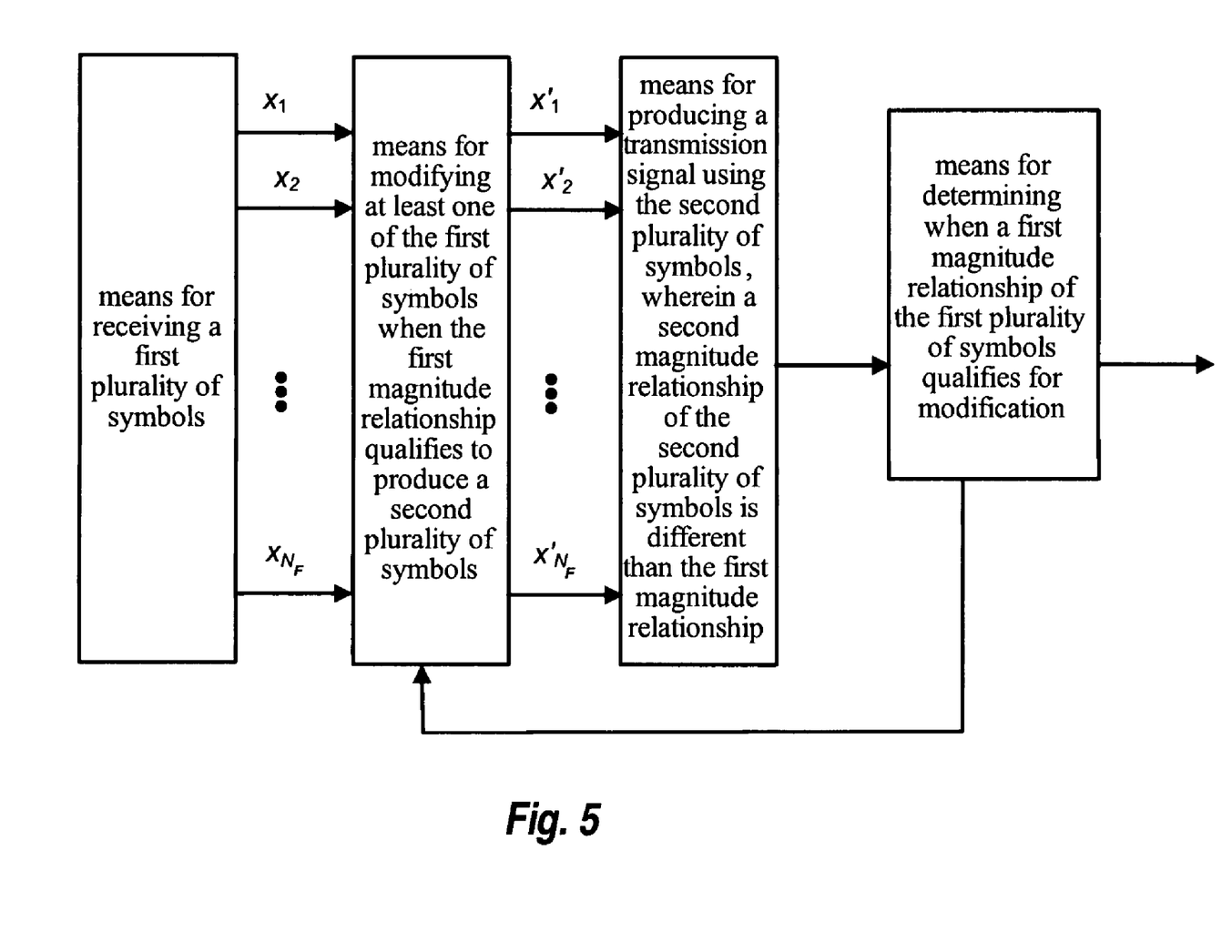
FIG. 5 illustrates a block diagram of aspects of a portion of a transmitter.

FIG. 5 illustrates block diagrams of aspects of systems that can be utilized for modification of magnitudes of transmission signals. Such systems can be utilized for implementing systems described herein, for example.

The techniques described herein, e.g. those described with respect to FIGS. 4A and 4B, may be implemented by various means. For example, these techniques may be implemented in hardware, software, or a combination thereof. For a hardware implementation, the processing units within a access point or a access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. A method for generating a transmission signal comprising:
employing a processor executing computer-executable instructions stored on a computer-readable storage medium to implement the following acts:
receiving a first plurality of symbols;
determining when a first magnitude relationship of the first plurality of symbols qualifies;
modifying at least one symbol of the first plurality of symbols when the first magnitude relationship qualifies to produce a second plurality of symbols, wherein modifying comprises transforming at least one bit of the at least one symbol, wherein the at least one bit includes a least significant bit of the at least one symbol; and
producing a transmission signal using the second plurality of symbols, wherein a second magnitude relationship of the second plurality of symbols is different than the first magnitude relationship.

2. The method for generating the transmission signal as recited in claim 1, further comprising repeating the determining, modifying and producing steps until the second magnitude relationship does not qualify.

3. The method for generating the transmission signal as recited in claim 1, wherein the magnitude relationship is indicative of a peak-to-average ratio (PAR) of the transmission signal.

4. The method for generating the transmission signal as recited in claim 1, wherein the determining comprises determining whether the first magnitude relationship is either above or below a predetermined threshold.

5. The method for generating the transmission signal as recited in claim 1, wherein the modifying includes modifying of at least one symbol of the first plurality of symbols during, before or after modulation.

6. The method for generating the transmission signal as recited in claim 1, wherein the modifying is performed in the frequency domain.

7. The method for generating the transmission signal as recited in claim 1, wherein the determining is performed in the time domain.

8. The method for generating the transmission signal as recited in claim 1, wherein the modifying includes modifying some, but not all bits, of the at least one symbol of the first plurality of symbols.

9. The method for generating the transmission signal as recited in claim 1, wherein the modifying comprises randomly choosing the at least one symbol from the first plurality of symbols.

10. The method for generating the transmission signal as recited in claim 1, wherein the modifying comprises randomly modifying.

11. The method for generating the transmission signal as recited in claim 1, wherein the modifying comprises modifying according to a genetic algorithm.

12. The method for generating the transmission signal as recited in claim 1, wherein the modifying comprises operating upon at least two least significant bits of the at least one symbol of the first plurality of symbols.

13. A method for generating a transmission signal comprising:
   employing a processor executing computer-executable instructions stored on a computer-readable storage medium to implement the following acts:
   receiving a first plurality of symbols in a frequency domain;
   determining a value indicative of a first magnitude relationship of the first plurality of symbols if converted into a first transmission signal in a time domain;
   determining whether the value reaches a threshold;
   modifying at least one of the first plurality of symbols in the time domain when the value reaches the threshold to produce a second plurality of symbols; and
   producing a second transmission signal using the second plurality of symbols.

14. The method for generating the transmission signal as recited in claim 13, wherein a second magnitude relationship of the second transmission signal is different than the first magnitude relationship.

15. The method for generating the transmission signal as recited in claim 13, wherein the modifying comprises modifying at least two of the first plurality of symbols.

16. The method for generating the transmission signal as recited in claim 13, wherein the modifying comprises modifying at least one quarter of the first plurality of symbols.

17. The method for generating the transmission signal as recited in claim 13, wherein the at least one is randomly chosen from the first plurality of symbols.

18. The method for generating the transmission signal as recited in claim 13, wherein the at least one is randomly modified.

19. The method for generating the transmission signal as recited in claim 13, wherein the at least one is modified according to a genetic algorithm.

20. The method for generating the transmission signal as recited in claim 13, wherein the modifying comprises operating upon a least significant bit of the at least one of the first plurality of symbols.

21. The method for generating the transmission signal as recited in claim 13, wherein the modifying comprises operating upon at least two least significant bits of the at least one of the first plurality of symbols.

22. A transmitter for sending a signal, the transmitter comprising:
   an analysis unit for analyzing a magnitude of a first transmission signal, wherein the first transmission signal is representative of a first plurality of symbols;
   a symbol modification unit modifies one or more symbols based, at least in part, on the magnitude, wherein:
   the symbol modification unit modifies the first plurality of symbols to produce a second plurality of symbols,
   the analysis unit provides feedback to the symbol modification unit when the first plurality of symbols are modified, and
   the first plurality of symbols and the second plurality of symbols represent a same data in the signal; and
   a transform unit that is coupled to the symbol modification unit and the analysis unit, wherein the transform unit converts the second plurality of symbols to a second transmission signal.

23. The transmitter for sending the signal as recited in claim 22, wherein the modification unit is triggered a peak-to-average ratio (PAR) of the first transmission signal.

24. The transmitter for sending the signal as recited in claim 22, wherein the analysis unit operates in the time domain.

25. The transmitter for sending the signal as recited in claim 22, wherein the symbol modification unit operates in the frequency domain.

26. The transmitter for sending the signal as recited in claim 22, wherein the first plurality of symbols would be deemed equivalent to the second plurality of symbols by a receiver of the transmission signal.

27. An apparatus for generating a transmission signal comprising:
   means for receiving a first plurality of symbols;
   means for determining when a first magnitude relationship of the first plurality of symbols qualifies;
   means for modifying at least one symbol of the first plurality of symbols when the first magnitude relationship qualifies to produce a second plurality of symbols, wherein the means for modifying comprises means for transforming at least one bit of the at least one symbol, wherein the at least one bit includes a least significant bit of the at least one symbol; and
   means for producing a transmission signal using the second plurality of symbols, wherein a second magnitude relationship of the second plurality of symbols is different than the first magnitude relationship.

28. The apparatus as recited in claim 27, wherein the magnitude relationship is indicative of a peak-to-average ratio (PAR) of the transmission signal.

29. The apparatus as recited in claim 27, wherein the means for determining comprises means for determining whether the first magnitude relationship is either above or below a predetermined threshold.

30. The apparatus as recited in claim 27, wherein the means for modifying includes means for modifying in a frequency domain.

31. The apparatus as recited in claim 27, wherein the means for determining includes means for determining in a time domain.

32. An apparatus for generating a transmission signal comprising:
   means for receiving a first plurality of symbols in a frequency domain;
   means for determining a value indicative of a first magnitude relationship of the first plurality of symbols if converted into a first transmission signal in a time domain;
   means for determining whether the value reaches a threshold;
   means for modifying at least one of the first plurality of symbols in the time domain when the value reaches the threshold to produce a second plurality of symbols; and
   means for producing a second transmission signal using the second plurality of symbols.

33. The apparatus as recited in claim 32, wherein the means for modifying comprises means for modifying at least two of the first plurality of symbols.

34. The apparatus as recited in claim 32, wherein the means for modifying comprises means for modifying at least one quarter of the first plurality of symbols.

35. A non-transitory computer-readable storage medium stored with a computer program executable by a processor that includes:
- instructions for causing a computer to receive a first plurality of symbols;
- instructions for causing the computer to determine when a first magnitude relationship of the first plurality of symbols qualifies;
- instructions for causing the computer to modify at least one symbol of the first plurality of symbols when the first magnitude relationship qualifies to produce a second plurality of symbols, wherein the modification comprises instructions for causing the computer to transform at least one bit of the at least one symbol, wherein the at least one bit includes a least significant bit of the at least one symbol; and
- instructions for causing the computer to produce a transmission signal using the second plurality of symbols, wherein a second magnitude relationship of the second plurality of symbols is different than the first magnitude relationship.

36. The non-transitory computer-readable storage medium as recited in claim 35, wherein the magnitude relationship is indicative of a peak-to-average ratio (PAR) of the transmission signal.

37. The non-transitory computer-readable storage medium as recited in claim 35, wherein the instructions for causing the computer to determine comprises instructions for causing the computer to determine whether the first magnitude relationship is either above or below a predetermined threshold.

38. The non-transitory computer-readable storage medium as recited in claim 35, wherein the instructions for causing the computer to modify comprises instructions for causing the computer to modify in a frequency domain.

39. The non-transitory computer-readable storage medium as recited in claim 35, wherein the instructions for causing the computer to determine comprises instructions for causing the computer to determine in a time domain.

40. A computer program comprising a tangible non-transitory computer-readable storage medium stored with a computer program executable by a processor that includes:
- instructions for causing a computer to receive a first plurality of symbols in a frequency domain;
- instructions for causing the computer to determine a value indicative of a first magnitude relationship of the first plurality of symbols if converted into a first transmission signal in a time domain;
- instructions for causing the computer to determine whether the value reaches a threshold;
- instructions for causing the computer to modify at least one of the first plurality of symbols in the time domain when the value reaches the threshold to produce a second plurality of symbols; and
- instructions for causing the computer to producing a second transmission signal using the second plurality of symbols.

41. The non-transitory computer-readable storage medium as recited in claim 40, wherein the instructions for causing the computer to modify comprises instructions for causing the computer to modify at least two of the first plurality of symbols.

42. The non-transitory computer-readable storage medium as recited in claim 40, wherein the instructions for causing the computer to modify comprises instructions for causing the computer to modify at least one quarter of the first plurality of symbols.

* * * * *